United States Patent Office 3,202,652
Patented Aug. 24, 1965

3,202,652
REACTIVE WATER-SOLUBLE MONOAZO-
DYESTUFFS
Fritz Meininger, Frankfurt am Main, and Walter Noll,
Bad Soden, Taunus, Germany, assignors to Farbwerke
Hoechst Aktiengesellschaft vormals Meister Lucius &
Brüning, Frankfurt am Main, Germany, a corporation
of Germany
No Drawing. Filed Mar. 12, 1963, Ser. No. 264,720
Claims priority, application Germany, Mar. 16, 1962,
F 36,287
4 Claims. (Cl. 260—200)

The present invention relates to valuable, easily water-soluble orange monoazo-dyestuffs and to a process for their manufacture; more particularly it relates to orange monoazo-dyestuffs having the general formula

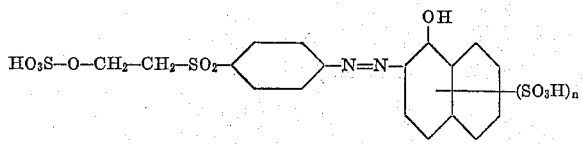

wherein $n$ is the integer 2 or 3.

It has been found that valuable, easily water-soluble orange monoazo-dyestuffs having the general formula

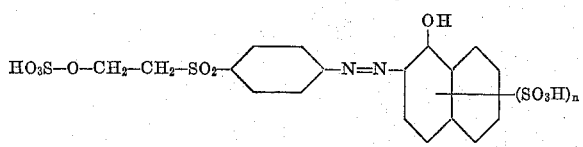

wherein $n$ is the integer 2 or 3, are obtained by diazotizing 1-aminobenzene-4-β-hydroxyethylsulfone, coupling it with 1-hydroxynaphthalene-polysulfonic acids and subsequently esterifying the hydroxyl group of the hydroxyethylsulfone radical with concentrated sulfuric acid, or by diazotizing the aforementioned amine in the form of the acid sulfuric acid ester and coupling it with 1-hydroxynaphthalene-polysulfonic acids.

The dyestuffs obtained are suitable for dyeing and printing various materials, in particular polyhydroxylated materials having a fibrous structure, such as regenerated cellulose, cellulose, linen, or above all, cotton. They are particularly suitable for use in the printing and pad-dyeing process in which the dystuffs are applied to the goods to be dyed by printing or padding and subsequently fixed with acid-binding agents.

The dyeings and prints obtained with the novel dyestuffs on cellulose fibers are distinguished by a very good fastness to wet processing, by their brilliant shades and a good to very good fastness to light. They are especially valuable, since they yield dyeings and prints, the stability of which against sulfurous acid is considerably better than that of the corresponding dyestuffs prepared from 2-hydroxynaphthalene-sulfonic acids.

The following examples serve to illustrate the invention, but they are not intended to limit it thereto, the parts being by weight unless otherwise stated and the relationship of parts by weight to parts by volume being the same as that of the kilogram to the liter.

*Example 1*

28.1 parts of 1-aminobenzene-4-β-hydroxyethylsulfone-sulfuric acid ester are neutralized in 50 parts by volume of water with 55 parts by volume of sodium carbonate solution of 10% strength, and subsequently 20 parts by volume of 5 N-sodium nitrite solution are added. The whole is then introduced into a mixture of 125 parts by volume of 2 N-hydrochloric acid and 200 parts of ice while stirring. When the diazotization is complete, 30.4 parts of 1-hydroxynaphthalene-3,8-disulfonic acid are introduced into the diazo solution, and then sodium acetate is added, until the coupling is complete. The dyestuff obtained is isolated by salting out with potassium chloride, filtered off and dried at 50° to 60° C. in a vacuum drying chamber.

There is obtained an orange red powder which dissolves in water to give an orange solution. It is suitable for dyeing, more particularly, however, for printing. Thus, when printing cotton in the presence of acid-binding agents, intense clear orange prints are obtained possessing a good to very good fastness to wet processing, to rubbing and to light.

*Example 2*

When introducing 10.6 parts of sodium carbonate into a mixture of 18.1 parts of 1-aminobenzene-4-β-hydroxyethylsulfone-sulfuric acid ester and 100 parts by volume of water, a neutral solution is obtained; 6.9 parts of sodium nitrite are added to the solution, and subsequently the whole is introduced into a mixture of 125 parts by volume of 2 N-hydrochloric acid and 200 parts of ice, while stirring. When the diazotization is complete, 34.4 parts of 1-hydroxynaphthalene-4,7-disulfonic acid are added and the pH-value is adjusted to 3.5 to 4.0 by adding 67 parts by volume of a solution of sodium acetate of 25% strength. The dyestuff obtained is separated from the solution with potassium chloride, filtered off and dried at 50° to 60° C.

There is obtained an orange powder which dissolves in water to give an orange solution. When printing in the presence of acid-binding agents natural and regenerated cellulose fibers are dyed intense, clear orange shades. The prints possess a good to very good fastness to wet processing, to light and to rubbing.

*Example 3*

28.1 parts of 1-aminobenzene-4-β-hydroxyethylsulfone-sulfuric acid ester are introduced into a mixture of 75 parts by volume of 2 N-hydrochloric acid and 100 parts of ice, while stirring, and the whole is diazotized at 0° to 5° C. with 20 parts by volume of 5 N-sodium nitrite solution; 30.4 parts of 1-hydroxynaphthalene-3,6-disulfonic acid are introduced into the diazo-solution, and subsequently sodium acetate is added to the mixture, until the coupling is complete. The dyestuff is separated by salting out with potassium chloride, filtered off and dried at 50° to 60° C. in a vacuum drying chamber.

There is obtained an orange powder which yields on cotton in the presence of acid-binding agents brilliant orange prints. The prints possess a very good fastness to light and a good to very good fastness to wet processing.

When replacing the 30.4 parts of 1-hydroxynaphthalene-3,6-disulfonic acid by 38.4 parts of 1-hydroxynaphthalene-3,6,8-trisulfonic acid, an orange dyestuff of similarly good properties is obtained.

*Example 4*

20.1 parts of 1-aminobenzene-4-β-hydroxyethylsulfone are diazotized in a mixture of 125 parts by volume of 2 N-hydrochloric acid and 100 parts of ice with 20 parts by volume of 5 N-sodium-nitrite solution. 30.4 parts of 1-hydroxynaphthalene-3,6-disulfonic acid are added to the diazo solution, and the pH-value of the mixture is raised to 2.5 to 3.0 by introducing slowly 26 parts of crystallized sodium acetate. When the coupling was complete, the dyestuff is salted out with potassium chloride and isolated. 50 parts of the dried dyestuff are introduced at room temperature into 150 parts of concentrated sulfuric acid and stirred for 10 to 15 hours. The solution is poured on 450 parts of ice, and the mixture is neutralized with about 155 parts of sodium carbonate until a pH-value of between 4.0 and 4.5 is obtained. The dyestuff obtained is isolated by precipitating it with a mixture of potassium chloride and sodium chloride. It is identical with the product described in Example 3.

We claim:
1. Water-soluble monoazo-dyestuffs having the formula

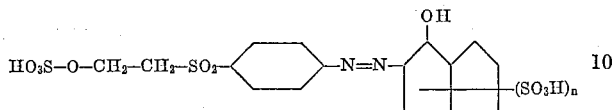

wherein the subscript $n$ represents an integer from 2 to 3.

2. The monoazo-dyestuff having the formula

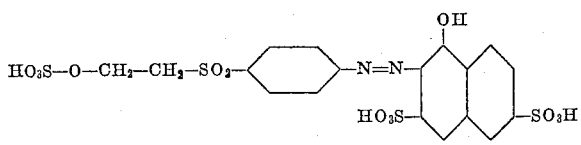

3. The monoazo-dyestuff having the formula

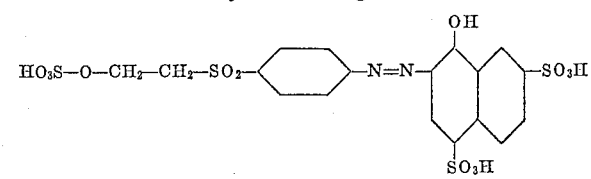

4. The monoazo-dyestuff having the formula

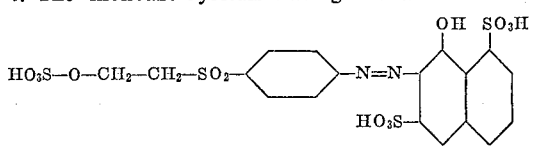

References Cited by the Examiner
FOREIGN PATENTS

| | | |
|---|---|---|
| 1,181,107 | 1/59 | France. |
| 1,219,489 | 12/59 | France. |
| 533,617 | 9/31 | Germany. |
| 712,037 | 7/54 | Great Britain. |
| 71,459 | 11/52 | Netherlands. |

CHARLES B. PARKER, *Primary Examiner.*